3,730,792
CATALYSIS OF REACTIONS OF AZIRIDINES USED IN PREPARING HIGH ENERGY COMPOSITE PROPELLANTS
Charles B. Frost, Fair Oaks, and Philip S. Gisler, Folsom, Calif., assignors to Aerojet-General Corporation, Azusa, Calif.
No Drawing. Filed Feb. 18, 1964, Ser. No. 346,384
Int. Cl. C06d 5/06; C08c 1/12
U.S. Cl. 149—19       11 Claims This invention relates to an improved method for the polymerization of functionally terminated polymers with polyfunctional aziridine compounds.

Known catalysts for the polymerization of functionally terminated polymers, such as, carboxy-terminated polybutadiene with polyfunctional aziridine compounds such as tris(methyl aziridinyl)phosphine oxide are known. Typical of the known catalysts for this purpose is lithium linoleate. However, the use of this catalyst has revealed several disadvantages. For example, this catalyst does not completely react the functional groups, and thus the polymer obtained possessses poor aging characteristics. Further, the use of this catalyst requires that the polymerization be carried out at relatively high temperatures for prolonged periods of time. The need for polymerization at high temperatures results in residual strains being produced in the polymer. These residual strains are especially serious in large masses of polymers such as are present in a cured solid rocket propellant.

Accordingly, it is an object of this invention to provide a novel catalyst for the polymerization of functionally terminated polymers with polyfunctional aziridine compounds. Another object of this invention is to provide a catalyst for the above-mentioned reactants which will completely react the functional groups to provide a polymer possessing improved aging characteristics. Still another object of this invention is to provide a catalyst which will enable the polymerization to proceed at lower temperatures and in shorter periods of time. These and other objects of this invention will become apparent from the detailed description which follows.

It has now been found that the reaction of functionally terminated polymers with polyfunctional aziridine compounds can be catalyzed with metals chelates having the general formula:

(I) 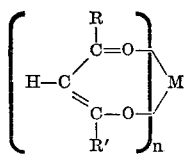

wherein R and R. are lower alkyl, preferably from 1 to about 4 carbon atoms such as methyl, ethyl, isopropyl and butyl; and M is a metal radical having a coordination number equal to twice its electrovalence; and $n$ is an integer which corresponds to the electrovalence of M. Typical of the metal chelates within the scope of Formula I, are, beryllium acetylacetone, ferric acetyloacetonate, aluminum acetylacetone, palladous acetylacetonate, thorium acetylacetonate, vanadyl acetylacetonate, chromium acetylacetonate, cerrous acetylacetonate, and zirconium acetylacetonate. Of those mentioned, zirconium cetylacetonate is the preferred catalyst. In the above formula, M may be a metal such as copper, beryllium, magnesium, stronium, zinc, mercury, aluminum, indium, lanthanum, cerium, samarium, zirconium, chromium, molybdenum, uranium, manganese, iron, cobalt, nickel, platinum, palladium, cesium, cadmium, thorium, vanadium, gallium, hafnium, lead, thallium and platonium.

In general, M is a metal from Groups I through VIII of the Periodic Table or from the lanthanum or actinium series. By metals of Groups I through VIII are intended all of those elements in (I) Groups I–A and II–A of Period 2,
(II) Groups I–A through III–A of Period 3,
(III) Groups I–A through IV–A, I–B through VIII–B, and VIII of Period 4,
(IV) Groups 1–A through V–A, I–B through VII–B and VIII of Period 5,
(V) Groups I–A through VI–A, I–B through VII–B and VIII of Period 6,
(VI) Groups I–A, II–A and III–B of Period 7, of the Periodic Table as it appears in the Handbook of Chemistry and Physics, 42nd edition, pages 448 and 449.

The functionally terminated polymers which can be reacted with the polyfunctional aziridine compounds in the presence of the above catalysts are those having the general formula:

(II)         $A_2(Y_2)_p$ wherein $A_2$ is a polymer of monomers containing a vinylidene group, $Y_2$ is a terminally reactive group selected from the group consisting of hydroxy, mercapto, amino and carboxy, and $p$ is an integer of at least 2, and generally an integer of from 2 to about 4. Normally, the $A_2$ group has a valence equal to $p$.

Included among the polymers which form the $A_2$ group in the terminally reactive polymers of Formula II are homopolymers of conjugated dienes having from 4 to 12 carbon atoms, preferably the polymers of conjugated dienes having from 4 to 8 carbons per molecule, such as 1,3-butadiene, isoprene, piperylene, 2-methyl-1,3-hexadiene, phenylbutadiene, 3,4-dimethyl-1,3-hexadiene, and 4,5-diethyl-1,3-octadiene. Among these, butadiene, isoprene and piperylene are preferred.

In addition to the conjugated dienes, other monomers which can be employed are isobutylene, aryl-substituted olefins, such as, styrene, various alkyl styrenes, such as vinyltoluene, para-methoxystyrene, vinylnaphthalene, and the like; heterocyclic nitrogen-containing monomers, such as, vinyl pyridine and vinyl quinoline; acrylic acid esters, such as, methyl methacrylate, ethyl methacrylate, propyl methacrylate, ethyl ethacrylate, butyl methacrylate; methyl vinyl ether, vinyl chloride, vinylidene chloride, vinyl acetate, vinylfuran, vinylcarbazole and vinylacetylene.

Polymers containing carboxy groups along the polymer chain, such as polymers of acrylic acid or methacrylic acid, can be polymerized with the aziridine compounds using the above-mentioned catalyst. Similarly, polyvinyl alcohol may be used.

The polymerization system of this invention can also be used to treat polymers of monoolefins having 2 to 8 carbon atoms such as polyethylene, polypropylene, polybutene, ethylene-propylene copolymers, and chlorinated, brominated, fluorinated and chlorosulfonated polymers such as polychloroprene, polybromoprene, polygluoroprene, chlorinated polyethylene, chlorinated polypropylene, brominated isobutyl-isoprene copolymer, chlorosulfonated polyethylene and chlorosulfonated polypropylene.

The above compounds, in addition to being polymerizable alone, are also copolymerizable with each other and may be copolymerized to form terminally reactive polymers. In addition, copolymers and terpolymers can be prepared using minor amounts of other ethylenically unsaturated monomers interpolymerizable with the above compounds. Typical of such monomers are vinylene carbonate, trans-vinylene diisocyanate, allyl alcohol, divinyl sulfone, acrylamide, vinylamide and acrylonitrile. Preferred interpolymers are those from butadiene and acrylic acid, and from butadiene, acrylic acid, and acrylonitrile.

The polymers of the above Formula II generally have a molecular weight from about 1000 to about 20,000, and more preferably a molecular weight of from about 4000 to about 8000. These polymers are normally liquid at room temperature and have a viscosity at 77° F. of from 5 to about 500 poises, more commonly, of from about 100 to about 350 poises.

The polymerization process of this invention has particular utility in treating terminally reactive polymers containing terminal carboxy (COOH) groups. As used herein, the term "terminally reactive polymer" denotes a polymer containing a reactive group on both ends of the polymer chain.

One class of aziridinyl compounds which can be polymerized with the polymers of Formula II in the presence of the chelate catalysts of our invention have the general formula:

II)

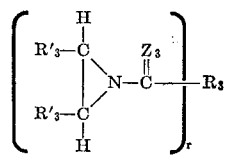

wherein $R_3$ is alkylene, preferably from 2 to about 20 carbon atoms, such as, methylene, hexamethylene, dodecamethylene and the like; arylene, preferably from 6 to 12 carbon atoms; trivalent organic radicals of the formula:

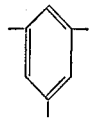

divalent or trivalent organic radicals of the formula:

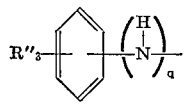

wherein $q$ equals 2 or 3, and $R''_3$ is hydrogen or lower alkyl of 1 to 4 carbons, preferably methyl; and divalent radicals of the formula

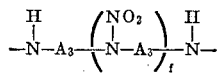

wherein $A_3$ is alkylene, preferably lower alkylene of from 1 to about 8 carbons and $f$ is 0 or 1. In the above formula, $r$ is an integer of from 2 to about 4, the numerical value of $r$ corresponding to the valence of $R_3$; $R'_3$ is hydrogen or lower alkyl of from 1 to about 8 carbons, such as, methyl, isopropyl and octyl; and $Z_3$ is oxygen or sulfur.

Another class of aziridinyl curing agents which can be used with the functionally terminated polymers of Formula II have the formula:

(IV)

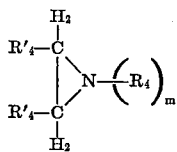

wherein $R_4$ is alkylene, preferably of from 1 to about 20 carbons; arylene, preferably of from 6 to 12 carbons; a trivalent radical of the formula:

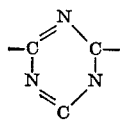

a divalent or trivalent radical of the formula:

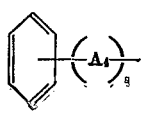

wherein $A_4$ is lower alkylene, preferably of from 1 to about 8 carbons, and $s$ is an integer equal to 2 or 3; and a trivalent organic radical of the formula:

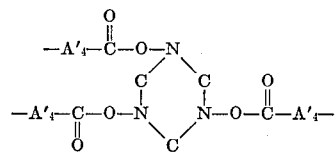

wherein $A'_4$ is lower alkylene, preferably of from 1 to about 8 carbons. In Formula IV, $m$ is an integer equal to the valence of $R_4$ and has a value of from 2 to about 4; and $R'_4$ is hydrogen or lower alkyl of from 1 to about 8 carbons.

Typical compounds within the scope of Formula III are:

bis(1,2 propylene)adipamide,
bis(1,2 propylene)isosebacamide,
bis(ethylene)adipamide,
bis(ethylene)isosebacamide,
bis(1,2 butylene)adipamide,
bis(1,2 butylene)isosebacamide,
bis(1,2 butylene)glutaramide,
bis(1,2 ethylene)glutaramide,
bis(1,2 ethylene)suberamide,
bis(1,2 propylene)suberamide,
bis(1,2 ethylene)malonamide,
bis(1,2 propylene)malonamide,
bis(1,2 butylene)malonamide,
bis(1,2 butylene)terephthalamide,
tris(N,1',2'-butylene)trimesamide,
1,8-diamino-octamethylene-bis[(1,2)-propylene] carboxamide,
1,4-diamino-butamethylene-bis[(1,2)-butylene] carboxamide,
1,6-diaminohexamethylene-bis[(1,2)-propylene] carboxamide,
1,5-diamino-3-nitraza pentamethylene-bis[(1,2-)-propylene]carboxamide,
2,4-diamino-tolyl-bis[(1.2)-propylene]carboxamide,
2,4,6-triamino-phenyl-tris[(1,2)-propylene]carboxamide,
2,4,6-triamino-phenyl-tris[(1,2)-butylene]carboxamide,
1,6-diaminohexamethylene-bis[(1,2)-pentylene] carboxamide,
1,5-diamino-3-nitraza pentamethylene-bis[(1,2)-pentylene]carboxamide,
2,4-diamino-tolyl-bis[(1,2)-pentylene]carboxamide,
2,3,5-triamino-phenyl-tris[(1,2)-pentylene]carboxamide,
2,4,6-triamino-phenyl-tris[(1,2)-pentylene]carboxamide.

Typical compounds encompassed by Formula IV are:

1,4-bis-(1-aziridinyl)butane,
1,10-bis-(1-aziridinyl)decane,
1,12-bis-(1-aziridinyl)dodecane,
2,4,6-tris-(2-ethyl-1-aziridinyl)-s-triazine,
2,4,6-tris-(2-methyl-1-aziridinyl)-s-triazine,
2,4,6-tris-(2-propyl-1-aziridinyl)-s-triazine,
tris-1,3,5-(2-methylaziridinylpropionyl)-hexahydro-s-triazine,
tris-1,3,5-(2-ethylaziridinylpropionyl)-hexahydro-s-triazine,
bis[β-(N-propyleneimino)ethyl]benzene,
bis[β-(N-ethyleneimino)ethyl]benzene,
bis[β-(N-butyleneimino)ethyl]benzene,
tris[β-(N-propyleneimino)ethyl]benzene,
tris[β-(N-ethyleneimino)ethyl]benzene,
tris[β-(N-butyleneimino)ethyl]benzene,
1,3-bis-(1-aziridinyl)propane,
1,8-bis-(1-aziridinyl)octane,
1,6-bis(1-aziridinyl)hexane, and
p-phenylene diethylene imine.

Still another class of curing agents for use in this invention are those having the formula:

(V) 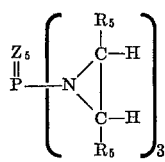

wherein $Z_5$ is selected from a group consisting of oxygen and sulfur and each of the $R_5$ groups is selected from a group consisting of hydrogen, alkyl, cycloalkyl, aryl, aralkyl and alkaryl radicals. Preferably, the R groups contain from 1 to about 20 carbon atoms.

Typical compounds within the scope of Formula V are:

tris(1-aziridinyl)phosphine oxide,
tris(2-methyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-ethyl-3-decyl-1-aziridinyl)phosphine oxide,
tri(2-ethyl-3-octadecyl-1-aziridinyl)phosphine oxide,
tri(2-methyl-3-cyclopentyl-1-aziridinyl)phosphine oxide,
tri(2-phenyl-1-aziridinyl)phosphine oxide,
tri[2-ethyl-3-(1-naphthyl)-1-aziridinyl]phosphine oxide,
tri(2-methyl-3-benzyl-1-aziridinyl)phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2-eicosyl-1-aziridinyl)phosphine sulfide,
tri(2-methyl-3-cyclohexyl-1-aziridinyl)phosphine sulfide, and
tri(2-phenyl-3-benzyl-1-aziridinyl)phosphine sulfide.

Of the above-mentioned aziridine compounds, bis(1,2-propylene)isosebacamide, tris(N,1′,2′ - butylene)trimesamide, tris(1-aziridinyl)phosphine oxide, and mixtures thereof, are preferred. Especially suitable mixtures are bis(1,2-propylene)isosebacamide plus tris(1-aziridinyl) phosphine oxide, and tris(N,1′,2′-butylene)trimesamide plus tris(1-aziridinyl)phosphine oxide.

The catalysts employed in the instant invention are normally present in an effective amount; i.e., a catalytic amount, from about 0.002 percent by weight to about 1 percent by weight of the total reaction mixture. However, higher proportions of catalysts can be used if desired. In general, the total amount of polyfunctional aziridine compound present in the polymerization medium is about that equivalent to the stoichiometric amount based on the total amount of the polymer of Formula II present. However, greater or lesser amounts of the polyfunctional aziridine compound may be present, from about 50 mole percent to about 140 mole percent of that corresponding to the stoichiometric amount.

The catalytic effect of the metal chelates of this invention on the rate of the reaction between tris(N,1′,2′-butylene)trimesamide with acetic acid was determined.

A series of solutions of tris(N,1′,2′ - butylene)trimesamide and acetic acid in dioxane, each having a normality of 1 with respect to tris(N,1′,2′-butylene)trimesamide and to acetic acid was prepared, and all but one having a metal compound incorporated therein as a reaction rate catalyst. These solutions were each placed in a constant temperature bath and maintained at 80° C. therein for a period of time, during which analytical data were obtained at various intervals of time. The reaction rate constants (K) were then obtained from the analytical data for each of the systems.

Table I gives the values of K for each of the solutions of this example.

TABLE I

| Catalyst | Concentration of catalyst (mole/liter) | K, liter/ equiv. hr. |
|---|---|---|
| None | | 0.040 |
| Lithium linoleate | 0.0874 | 0.062 |
| Do | 0.175 | 0.080 |
| Do | 0.350 | 0.105 |
| Zirconium acetylacetonate | 0.064 | 0.090 |
| Do | 0.128 | 0.32 |
| Do | 0.256 | 0.35 |

The results in the above table show that, in every case, the catalyst employed increased the rate of reaction over the rate in which no catalyst was used. The use of zirconium acetylacetonate resulted in a substantial increase in the rate of reaction over that obtained with approximately the same amount of lithium linoleate.

The polymerization according to the present invention may be carried out at a temperature from about 40° F. to about 180° F. More preferably, the reaction is carried out at a temperature from about 80° F. to about 135° F.

The following is an example of the preparation of a rubbery, high molecular weight polymer employing a chelate compound within the scope of this invention as the catalyst.

EXAMPLE I

| Ingredient: | Parts by weight |
|---|---|
| Carboxy-terminated polybutadiene (M.W.=6000) | 79.30 |
| Tris(methyl aziridinyl)phosphine oxide | 1.00 |
| Tris(M-1′,2′-butylene)trimesamide | 2.00 |
| Zirconium acetylacetonate | 0.40 |

The above compositions is thoroughly mixed and cured for about 48 hours at about 130° F. The product obtained is rubbery in nature.

When the above example is repeated using amine-terminated polyisobutylene in lieu of the carboxy-terminated polybutadiene, a rubbery product is again obtained.

As has been noted above, the chelate catalyst of this invention may be employed to catalyze the polymerization of the functionally-terminated compounds of Formula II with one or more of the aziridine compounds of Formulae III through V, to provide high molecular weight polymers suitable as a binder for solid rocket propellants. These propellants are used as the primary propulsion source in rockets and in missiles. The propellant is preferably cast directly into the rocket chamber in which it is to be fired. Rocket chambers such as those in which the propellants are employed are ordinarily of the conventional type having one end open and leading to a venturi rocket nozzle. Upon ignition, large quantities of gases are produced and exhausted through the nozzle creating propulsive force.

In addition to the binder ingredients, the propellant contains inorganic oxidizing salts such as the perchlorates of ammonia, hydrazine and guanidine. Other inorganic oxidizing agents are potassium nitrate, ammonium nitrate and nitronium perchlorate. Organic oxidizing agents such as the organic amine perchlorates and nitrates may also be used. Various other additives may be employed in the propellant prepared by the process of this invention. For example, plasticizers familiar to those skilled in the art such as dioctyl azelate, bis-2,2-dinitropropyl acetal, isodecyl pelargonate and polybutene may be utilized. Burning rate accelerators such as copper chromite may be used in an effective catalytic amount from about 0.1 percent to about 4 percent by weight based on the total weight of the propellant. Various other additives other than those specifically mentioned may also be employed in minor amounts in the propellant prepared according to this invention. For example, antioxidants and metal fuels, such as powdered aluminum and powdered beryllium, may be used. Likewise, metal staple such as aluminum staple may be incorporated to increase the burning rate of the propellant.

The blending and mixing of the propellant may be carried out in a variety of ways. One method of accomplishing this is by adding the polymer of Formula II to an internal mixer, degassing it, then adding the wetting agents, stabilizers, fillers, processing aids, plasticizers and combustion additives, and mixing until these materials have been thoroughly blended into the polymer. Then the oxidizer or oxidizers are added and mixed under vacuum. After all of the oxidizer has been added, the polyfunctional aziridine compound and the chelate catalyst are added and mixed under vacuum until incorporated. The mixture is then cast, preferably under vacuum, into the rocket casing. The foregoing is but one way in which the propellant mixing may be accomplished. Many modifications of this procedure are possible and will be apparent to those skilled in the art.

In the propellants prepared according to this invention, the propellant binder is generally employed in a proportion within the range of from about 5 to about 55 percent, and the oxidizing agent in an amount within the range of from about 95 to about 45 percent by weight.

The following are solid propellants which are prepared employing the novel chelate catalysts of this invention.

EXAMPLE II

| Ingredients: | Parts by weight |
| --- | --- |
| Ammonium perchlorate | 74.00 |
| Powdered aluminum | 10.00 |
| Carboxy-terminated polybutadiene (M.W.=6000) | 9.30 |
| Isodecyl pelargonate | 5.23 |
| Zirconium acetylacetonate | 0.05 |
| Tris(1-aziridinyl)phosphine oxide | 0.13 |
| Tris(N-1',2'-butylene)trimesamide | 0.29 |
| Iron oxide | 1.00 |
| | 100.00 |

When the above example is repeated employing aluminum acetylacetonate in lieu of zirconium acetylacetonate, a cured solid propellant is also obtained.

EXAMPLE III

| Ingredients: | Parts by weight |
| --- | --- |
| Ammonium perchlorate | 74.00 |
| Powdered aluminum | 10.00 |
| Carboxy-terminated polybutadiene (M.W.=6000) | 9.17 |
| Isodecyl pelargonate | 5.16 |
| Zirconium acetylacetonate | 0.05 |
| Tris(1-aziridinyl)phosphine oxide | 0.13 |
| Tris(N-1',2'-butylene)trimesamide | 0.29 |
| Iron oxide | 1.20 |
| | 100.00 |

EXAMPLE IV

| Ingredients: | Parts by weight |
| --- | --- |
| Ammonium perchlorate | 81.50 |
| Powdered aluminum | 1.00 |
| Aluminum staple | 4.00 |
| Copper chromite | 1.50 |
| Lecithin | 0.20 |
| Carboxy-terminated polybutadiene (M.W.=6000) | 7.93 |
| Tris(N-1',2'-butylene)trimesamide | 0.30 |
| Isodecyl pelargonate | 3.53 |
| Zirconium acetylacetonate | 0.04 |
| | 100.00 |

When the above example is repeated employing hydroxy-terminated polyisoprene in lieu of the carboxy-terminated polybutadiene, and chromium acetylacetonate in lieu of zirconium acetylacetonate, a satisfactory, high energy, solid propellant is obtained.

Having fully described the invention, it is intended to be limited only by the scope of the appended claims.

We claim:

1. The method of preparing a cured polymeric composition comprising reacting a terminally reactive polymer having the formula:

$$A_2(Y_2)_p$$

wherein $A_2$ comprises a polymer of a polymerizable vinylidene compound, $Y_2$ is selected from the group consisting of carboxy, hydroxy, amine and mercapto, and $p$ is an integer of at least 2; with an aziridine compound selected from the group consisting of those having the formula:

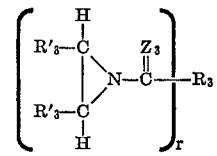

wherein $R_3$ is selected from the group consisting of alkylene, arylene, trivalent organic radicals of the formula:

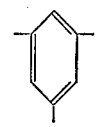

organic radicals of the formula:

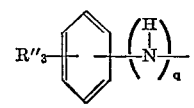

wherein $q$ is an integer of from 2 to 3 and $R''_3$ is selected from the group consisting of hydrogen and lower alkyl, and divalent radicals of the formula:

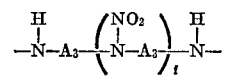

wherein $A_3$ is alkylene, and $f$ is selected from the group consisting of 0 and 1; $r$ is an integer of from 2 to about 4 and corresponds numerically to the valence of $R_3$; $R'_3$ is selected from the group consisting of hydrogen and lower alkyl and $Z_3$ is selected from the group consisting of oxygen and sulfur; those having the formula:

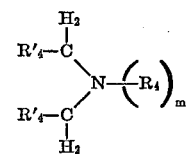

wherein $R_4$ is selected from the group consisting of alkylene, arylene, a trivalent radical of the formula:

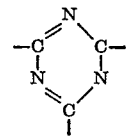

a radical of the formula:

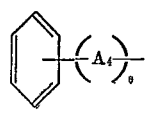

wherein $A_4$ is lower alkylene and $s$ is an integer of from 2 to 3; and a trivalent organic radical of the formula:

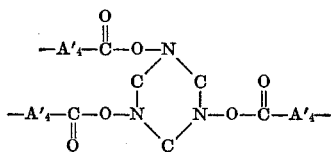

wherein $A'_4$ is lower alkylene; $m$ is an integer of from 2 to about 4, and corresponds numerically to the valence of $R_4$, and $R'_4$ is selected from the group consisting of hydrogen and lower alkyl; and those having the general formula:

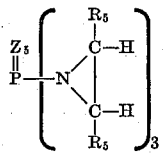

wherein $Z_5$ is selected from the group consisting of oxygen and sulfur, and $R_5$ is selected from the group consisting of hydrogen and hydrocarbyl; in the presence of a chelate catalyst of the formula:

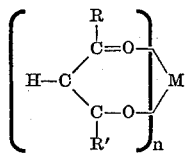

wherein R and R' are lower alkyl, M is a metal radical having a coordination number equal to twice its electrovalence, and $n$ is an integer which corresponds to the electrovalence of M.

2. The method of preparing a cured polymeric composition comprising reacting a terminally reactive polymer having the formula:

$$A_2(Y_2)_p$$

wherein $A_2$ comprises a polymer of a polymerizable vinylidene compound, $Y_2$ is selected from the group consisting of carboxy, hydroxy, amine and mercapto, and $p$ is an integer of at least 2; with an aziridine compound selected from the group consisting of those having the formula:

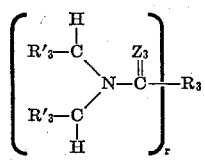

wherein $R_3$ is selected from the group consisting of alkyene, arylene, trivalent organic radicals of the formula:

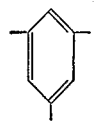

organic radical of the formula:

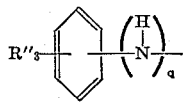

wherein $q$ is an integer of from 2 to 3 and $R''_3$ is selected from the group consisting of hydrogen and lower alkyl, and divalent radicals of the formula:

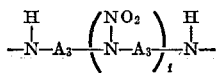

wherein $A_3$ is alkylene, and $f$ is selected from the group consisting of 0 and 1; $r$ is an integer of from 2 to about 4 and corresponds numerically to the valence of $R_3$; $R'_3$ is selected from the group consisting of 0 and 1; $r$ is an integer of from 2 to about 4 and corresponds numerically to the valence of $R_3$; $R'_3$ is selected from the group consisting of hydrogen and lower alkyl and $Z_3$ is selected from the group consisting of oxygen and sulfur; those having the formula:

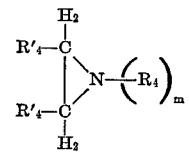

wherein $R_4$ is selected from the group consisting of alkylene, arylene, a trivalent radical of the formula:

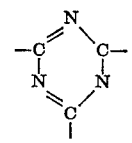

a radical of the formula:

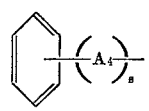

wherein $A_4$ is lower alkylene and $s$ is an integer of from 2 to 3; and a trivalent organic radical of the formula:

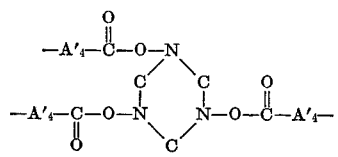

wherein $A'_4$ is lower alkylene; $m$ is an integer of from 2 to about 4, and corresponds numerically to the valence of $R_4$, and $R'_4$ is selected from the group consisting of hydrogen and lower alkyl; and those having the general formula:

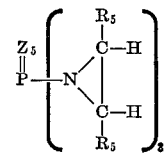

wherein $Z_5$ is selected from the group consisting of oxygen and sulfur, and $R_5$ is selected from the group consisting of hydrogen and hydrocarbyl; in the presence of zicronium acetylacetonate as the catalyst.

3. In the method of preparing a high energy propellant composition which comprises intimately dispersing a solid oxidizer salt in a binder mixture comprising a terminally reactive polymer having the formula:

$$A_2(Y_2)_p$$

wherein $A_2$ comprises a polymer of a polymerizable vinylidene compound; $Y_2$ is selected from the group consisting of carboxy, hydroxy, amine, and mercapto, and $p$ is an integer of at least 2; and an aziridine compound selected from the group consisting of those having the formula:

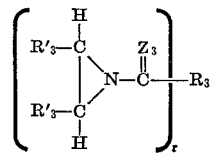

wherein R₃ is selected from the group consisting of alkylene, arylene, trivalent organic radicals of the formula:

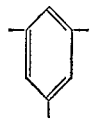

organic radicals of the formula:

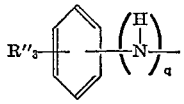

wherein $q$ is an integer of from 2 to 3 and R″₃ is selected from the group consisting of hydrogen and lower alkyl; and divalent radicals of the formula:

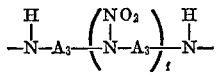

wherein A₃ is alkylene, and $f$ is selected from the group consisting of 0 and 1; $r$ is an integer of from 2 to about 4 and corresponds numerically to the valence of R₃; R′₃ is selected from the group consisting of hydrogen and lower alkyl and Z₃ is selected from the group consisting of oxygen and sulfur; those having the formula:

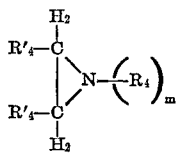

wherein R₄ is selected from the group consisting of alkylene, arylene, a trivalent radical of the formula:

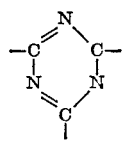

a radical of the formula:

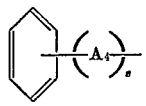

wherein A₄ is lower alkylene and $s$ is an integer of from 2 to 3; and a trivalent organic radical of the formula:

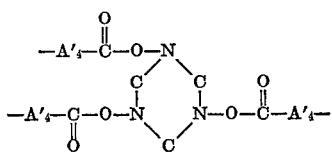

wherein A′₄ is lower alkylene; $m$ is an integer of from 2 to about 4, and corresponds numerically to the valence of R₄, and R′₄ is selected from the group consisting of hydrogen and lower alkyl; and those having the general formula:

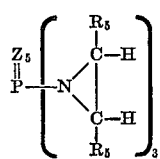

wherein Z₅ is selected from the group consisting of oxygen and sulfur, and R₅ is selected from the group consisting of hydrogen and hydrocarbyl; the improvement which comprises employing a chelate catalyst of the formula etc. as in claim 1.

4. In the method of preparing a high energy propellant composition which comprises intimately dispersing a solid oxidizer salt in a binder mixture comprising a terminally reactive polymer having the formula:

$$A_2(Y_2)_p$$

wherein A₂ comprises a polymer of a polymerizable vinylidene compound; Y₂ is selected from the group consisting of carboxy, hydroxy, amine, and mercapto, and $p$ is an integer of at least 2; and an aziridine compound selected from the group consisting of those having the formula:

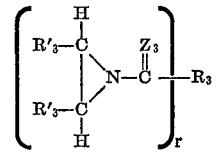

wherein R₃ is selected from the group consisting of alkylene, arylene, trivalent organic radicals of the formula:

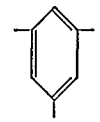

organic radicals of the formula:

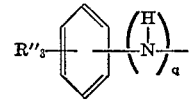

wherein $q$ is an integer of from 2 to 3 and R″₃ is selected from the group consisting of hydrogen and lower alkyl; and divalent radicals of the formula:

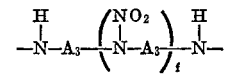

wherein A₃ is alkylene, and $f$ is selected from the group consisting of 0 and 1; $r$ is an integer of from 2 to about 4 and corresponds numerically to the valence of R₃; R′₃ is selected from the group consisting of hydrogen and lower alkyl and Z₃ is selected from the group consisting of oxygen and sulfur; those having the formula:

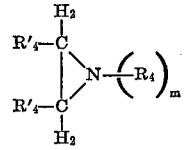

wherein R₄ is selected from the group consisting of alkylene, arylene, a trivalent radical of the formula:

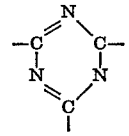

a radical of the formula:

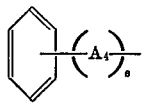

wherein A₄ is lower alkylene and $s$ is an integer of from 2 to 3; and a trivalent organic radical of the formula:

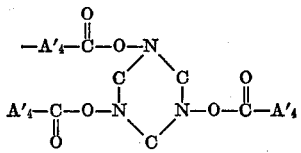

wherein A′₄ is lower alkylene; $m$ is an integer of from 2 to about 4, and corresponds numerically to the valence of $R_4$; and $R'_4$ is selected from the group consisting of hydrogen and lower alkyl; and those having the general formula:

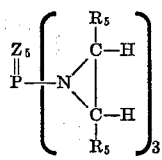

wherein $Z_5$ is selected from the group consisting of oxygen and sulfur, and $R_5$ is selected from the group consisting of hydrogen and hydrocarbyl; the improvement which comprises employing zirconium acetylacetonate as the catalyst.

5. The method of preparing a cured polymeric composition comprising reacting a terminally reactive polymer having the formula:

$$A_2(Y_2)_p$$

wherein $A_2$ comprises a polymer of a polymerizable vinylidene compound; $Y_2$ is selected from the group consisting of carboxy, hydroxy, amine, and mercapto, and $p$ is an integer of at least 2; with an aziridine compound having the formula:

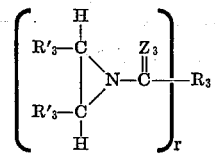

wherein $H_3$ is selected from the group consisting of alkylene, arylene, trivalent organic radicals of the formula:

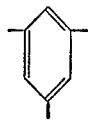

organic radicals of the formula:

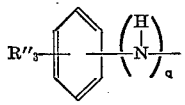

wherein $q$ is an integer of from 2 to 3 and $R''_3$ is selected from the group consisting of hydrogen and lower alkyl; and divalent radicals of the formula:

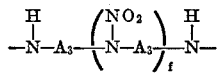

wherein $A_3$ is alkylene, and $f$ is selected from the group consisting of 0 and 1; $r$ is an integer of from 2 to about 4 and corresponds numerically to the valence of $R_3$; $R'_3$ is selected from the group consisting of hydrogen and lower alkyl and $Z_3$ is selected from the group consisting of oxygen and sulfur; in the presence of a chelate etc. as in claim 1.

6. The method of preparing a cured polymeric composition comprising reacting a terminally reactive polymer having the formula:

$$A_2(Y_2)_p$$

wherein $A_2$ comprises a polymer of a polymerizable vinylidene compound, and $Y_2$ is carboxy; with an aziridine compound having the formula:

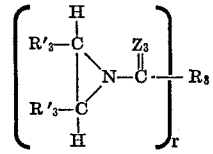

wherein $R_3$ is selected from the group consisting of alkylene, arylene, trivalent organic radicals of the formula:

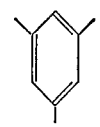

organic radicals of the formula:

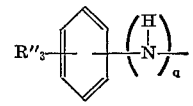

wherein $q$ is an integer of from 2 to 3 and $R''_3$ is selected from the group consisting of hydrogen and lower alkyl, and divalent radicals of the formula:

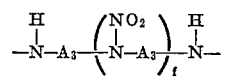

wherein $A_3$ is alkylene, and $f$ is selected from the group consisting of 0 and 1; $r$ is an integer of from 2 to about 4 and corresponds numerically to the valence of $R_3$, $R'_3$ is selected from the group consisting of hydrogen and lower alkyl and $Z_3$ is selected from the group consisting of oxygen and sulfur; in the presence of zirconium acetylacetonate as the catalyst.

7. The method of preparing a cured polymeric composition comprising reacting a terminally reactive polymer having the formula:

$$HOOC-A_2-COOH$$

wherein $A_2$ comprises a polymer of a polymerizable diene compound; with an aziridine compound selected from the group consisting of tris(N-1',2'-butylene)trimesamide, tris(methyl aziridinyl)phosphine oxide, bis(1,2-propylene)isosebacamide and mixtures thereof; in the presence of a chelate catalyst of the formula etc. as in claim 1.

8. The method of preparing a cured polymeric composition comprising reacting a terminally reactive polymer having the formula:

$$HOOC-A_2-COOH$$

wherein $A_2$ comprises a polymer of a polymerizable diene compound; with an aziridine compound selected from the group consisting of tris(N-1',2'-butylene)trimesamide, tris(methyl aziridinyl)phosphine oxide, bis(1,2-propylene)isosebacamide and mixtures thereof; in the presence of zirconium acetylacetonate as the catalyst.

9. In the method of preparing a high energy propellant composition which comprises dispersing a solid oxidizer in a binder mixture comprising a terminally reactive polymer having the formula:

$$HOOC-A_2-COOH$$

wherein $A_2$ comprises a polymer of butadiene, said terminally reactive polymer having a molecular weight of about 6000, and an aziridine compound having the general formula:

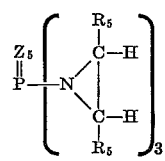

wherein $Z_5$ is selected from the group consisting of oxygen and sulfur, and $R_5$ is selected from the group consisting of hydrogen and hydrocarbyl; the improvement which comprises employing zirconium acetylacetonate as the catalyst.

10. In the method of preparing a high energy propellant composition which comprises dispersing a solid oxidizer in a binder mixture comprising a terminally reactive polymer having the formula:

HOOC—A₂—COOH wherein A₂ comprises a polymer of butadiene, said terminally reactive polymer having a molecular weight of about 6000; and an aziridine compound having the formula:

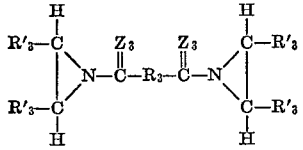

wherein $R_3$ is alkylene, $R'_3$ is selected from the group consisting of hydrogen and lower alkyl, and $Z_3$ is selected from the group consisting of oxygen and sulfur; the improvement which comprises employing zirconium acetylacetonate as the catalyst.

11. In the method of preparing a high energy propellant composition which comprises dispersing a solid oxidizer in a binder mixture comprising a terminally reactive polymer having the formula:

HOOC—A₂—COOH wherein A₂ comprises a polymer of butadiene, said terminally reactive polymer having a molecular weight of about 6000; and an aziridine compound having the formula:

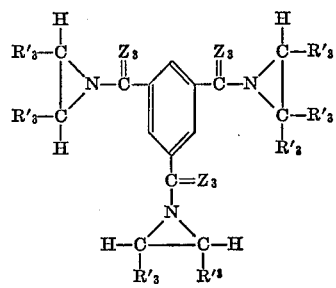

wherein $R'_3$ is selected from the group consisting of hydrogen and lower alkyl, and $Z_3$ is selected from the group consisting of oxygen and sulfur; the improvement which comprises employing zirconium acetylacetonate as the catalyst.

References Cited
UNITED STATES PATENTS 3,147,161   9/1964   Abere _____ 149—19
3,155,552   11/1964  Vriesen _____ 149—19

BENJAMIN R. PADGETT, Primary Examiner

U.S. Cl. X.R.

149—20; 260—2 EN, 80 M, 80.3 R, 80.7, 82.1, 83.5, 83.7, 84.1, 85.3 C, 85.5 M, 88.7 C, 89.7 R